(12) United States Patent
Jeong et al.

(10) Patent No.: US 11,731,704 B2
(45) Date of Patent: Aug. 22, 2023

(54) VEHICLE OCCUPANT INJURY PREVENTION STRUCTURE

(71) Applicants: HYUNDAI MOTOR COMPANY, Seoul (KR); KIA CORPORATION, Seoul (KR)

(72) Inventors: Songjae Jeong, Suwon-si (KR); HanSeok Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 25 days.

(21) Appl. No.: 17/481,264

(22) Filed: Sep. 21, 2021

(65) Prior Publication Data
US 2022/0250683 A1   Aug. 11, 2022

(30) Foreign Application Priority Data
Feb. 10, 2021   (KR) .................. 10-2021-0019003

(51) Int. Cl.
| | | |
|---|---|---|
| *B62D 21/15* | (2006.01) | |
| *B62D 25/14* | (2006.01) | |
| *B62D 25/20* | (2006.01) | |
| *B60K 26/02* | (2006.01) | |
| *B60N 3/06* | (2006.01) | |
| *B60R 13/02* | (2006.01) | |
| *B62D 25/08* | (2006.01) | |
| *B60R 21/00* | (2006.01) | |
| *B60R 21/02* | (2006.01) | |

(52) U.S. Cl.
CPC ........... *B62D 21/152* (2013.01); *B62D 25/14* (2013.01); *B62D 25/2018* (2013.01); *B60K 26/02* (2013.01); *B60N 3/066* (2013.01); *B60R 13/02* (2013.01); *B60R 21/02* (2013.01); *B60R 2021/0004* (2013.01); *B60Y 2306/01* (2013.01); *B62D 25/08* (2013.01); *B62D 25/20* (2013.01)

(58) Field of Classification Search
CPC .. B62D 21/152; B62D 25/14; B62D 25/2018; B62D 25/20; B62D 25/08; B60K 26/02; B60Y 2306/01; B60N 3/066; B60R 21/02; B60R 13/02; B60R 2021/0004
USPC ...................................................... 296/187.09
See application file for complete search history.

(56) References Cited

U.S. PATENT DOCUMENTS

| | | | | |
|---|---|---|---|---|
| 7,055,893 | B2 * | 6/2006 | Yamamura ............. | B62D 21/15 296/97.23 |
| 9,932,071 | B1 * | 4/2018 | Rivellini ............. | B62D 21/152 |

* cited by examiner

*Primary Examiner* — Joseph D. Pape
*Assistant Examiner* — Dana D Ivey
(74) *Attorney, Agent, or Firm* — McDonnell Boehnen Hulbert & Berghoff LLP

(57) ABSTRACT

An injury preventing structure located in a vehicle is provided and comprises a lower member and an upper member which distribute impact of a vehicle, and a panel which forms a bottom surface of the vehicle, in which the upper member and the lower member are in contact with the panel to form a closed cross-section between each member and the panel, and a position at which the panel is in contact with a rear end of the upper member and a position at which the panel is in contact with a front end of the lower member at least partially overlap each other to form a collision transformation support shaft. Accordingly, it is possible to prevent injury of the legs of a first or frontrow occupant even with a reduced cross-section of the upper member. It is additionally possible to further reduce the first row space of the vehicle, thereby also securing the rear seat and cargo loading space.

10 Claims, 16 Drawing Sheets

<SECTION A-A>

(a)  (b)

VEHICLE OCCUPANT INJURY PREVENTION STRUCTURE

CROSS-REFERENCE TO RELATED APPLICATION

This application claims priority to and the benefit of Korean Patent Application No. 10-2021-0019003 filed in the Korean Intellectual Property Office on Feb. 10, 2021, the entire contents of which are incorporated herein by reference.

BACKGROUND

(a) Field

The present disclosure relates to a vehicle occupant injury prevention structure, and more particularly, to a vehicle occupant injury prevention structure which prevents leg injuries of first row occupants even when a first row seat of the vehicle moves forward and a space in the first row is reduced.

(b) Description of the Related Art

The matters described in the description of the related art are to enhance the understanding of the background of the disclosure, and may include matters that are not already known to those skilled in the art to which the present technology belongs.

In the wake of the recent global epidemic of SARS-CoV-2 (COVID-19), social distancing that minimizes contact with others, that is, "untact" meaning non contact, has exponentially increased. Such social distancing may cause stress in people. Accordingly, the term Chabak, which means people can release stress and enjoy the romance of travel while keeping social distancing, is gaining popularity.

Chabak means sleeping and staying in a vehicle, and people can do Chabak anywhere, and can enjoy camping with minimal equipment without burden of large equipment. In particular, for "Chabak", it is important to create a flat space in which a person can lie down in the vehicle, and therefore, vehicles with sufficient interior space are enjoying great popularity.

A representative example of a vehicle with sufficient interior space is a multi-purpose vehicle (MPV). The MPV is a generic term for minivan vehicles, and is a vehicle that can be used for multiple purposes, not a divided concept of riding, van, or truck. The MPV is used for multiple purposes, such as commuting, leisure, shopping, and business use.

In order to improve the commercial value of the MPV, it is desirable to secure a wider space for the rear seat of the vehicle. As an example, a method of increasing the vehicle overall length and wheelbase has been suggested, but the vehicle is classified according to a set standard, and there is a limit to obtain additional competitiveness in the same way as above in a vehicle of the same class. For example, a compact car t satisfy the following conditions: a displacement of less than 1000 cc, an overall length of 3.6 meters (m), an overall width of 1.6 m, and an overall height of 2.0 m or less, and a small vehicle must satisfy the following conditions; a displacement of less than 1600 cc, an overall length of 4.7 m, an overall width of 1.7 m, and a height of 2.0 m or less.

Accordingly, in order to additionally secure a rear seat space of the MPV, conventional technologies for reducing an engine room and the first row space of a vehicle have been proposed. However, the engine room is the space where the engine and various accessories are arranged, and it is impossible to reduce the space unless the sizes of the engine and the accessories are reduced. Accordingly, an attempt was made to reduce the first row space of the vehicle, but the following problems occur.

FIG. 1a is a diagram schematically illustrating a lower part of the first row space of a vehicle in the related art, and FIG. 1b is a schematic cross-sectional view taken along line H-h of FIG. 1a. An outer shape of the lower part of the drivers seat of the first row space of the vehicle consists of a panel 3, and as illustrated in FIG. 1b an accelerator pedal 1 is provided through the panel 3 based on the drivers right foot. An upper member 4, which absorbs collision energy when the vehicle collides, is provided under the accelerator pedal 1, and similarly, a lower member 2, which distributes collision energy when the vehicle collides, is provided at a lower end of the rear side based on the drivers foot.

When the first row seat is configured to be moved further forward in order to reduce the size of the first row space of the vehicle, the reduction of the cross-section of the upper member 4 is unavoidable. The cross-section of the upper member 4 is formed by the product of the multiplication of the length in the overall length direction of the vehicle and the length of the vehicle overall height direction, so that when the length in the overall length direction of the vehicle is reduced, the cross-section of the upper member 4 is also reduced. Accordingly, when the vehicle collides, due to the reduced cross-section of the upper member 4, the vehicle body may not absorb all the impact, and thus the impact may be transmitted to the foot 6 of the driver in the first row.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an occupant injury preventing structure of a vehicle, which is capable of preventing leg injury to first row occupants even when the first row seat moves forward and the first row space is reduced.

The present disclosure has also been made in an effort to provide an occupant injury preventing structure of a vehicle, which additionally secures a rear seat and cargo space that is an important commercial value for not only multi-person transportation and cargo transportation, but also for Chabak which has increased in popularity in recent years through the modification of the cross-sectional structures of an upper member and a lower member.

An exemplary embodiment of the present disclosure provides an injury preventing structure, including a lower member and an upper member which distribute impact of a vehicle, and a panel which forms a bottom surface of the vehicle, in which the upper member and the lower member are in contact with the panel to form a closed cross-section between each member and the panel, and a position at which the panel is in contact with a rear end of the upper member and a position in which the panel is in contact with a front end of the lower member at least partially overlap each other to form a collision transformation support shaft.

The dosed cross-section formed by the upper member and the panel may be formed in front of the collision transformation support shaft based on a direction of an overall length of the vehicle, and the dosed cross-section formed by the lower member and the panel may be formed behind the collision transformation support shaft.

The lower member may be provided in a lower portion of the panel, and the upper member may be provided in an upper portion of the panel.

The lower member may be formed by cross-linking a first shaft extending in a direction of an overall length of the vehicle and a second shaft extending in a direction of an overall width of the vehicle.

The first shaft may be formed by coupling a side inner member, a side outer member, and a rear lower member, and the second shaft may be formed of a dash tunnel member located inside the vehicle, a side outer front member and a side outer rear member located outside the vehicle.

The upper member may include a dash member, and a center floor member extending to the rear side in the direction of the overall length of the vehicle, and the dash member may include a side dash member extending in the direction of the overall width of the vehicle.

The collision transformation support shaft may be formed at a location at which a front end in the direction of an overall length of the second shaft of the lower member faces a rear end in the direction of an overall length of the dash member.

The second shaft of the lower member may be in contact with the panel to form a closed cross-section extending in a direction of the overall width of the vehicle.

The side dash member may be in contact with the panel to form a closed cross-section extending in the overall width of the vehicle.

The panel may be formed of a dash panel that is in contact with the collision transformation support shaft, and a center floor panel which is connected with the dash panel and extends in the rear side in the direction of the overall length of the vehicle.

According to the exemplary embodiment of the present disclosure, the collision transformation support shaft is formed in a coupling part of the upper member and the lower member in front of an occupant's foot, so that it is possible to minimize transformation of a vehicle body of a rear side of the collision transformation support shaft when a frontal collision of a vehicle occurs, thereby preventing injury of an occupant's leg.

Further, through the exemplary embodiment of the present disclosure, it is possible to prevent injury of the legs of the first row occupant even with the cross-section of the upper member, which is reduced by about 20% compared to the related art.

Accordingly, it is possible to further reduce the first row space of the vehicle, thereby additionally securing the rear seat and cargo loading space compared to the related art. Particularly, it is possible to improve a commercial value of a multi-purpose vehicle (MPV).

In addition, the effects obtainable or predicted by the exemplary embodiments of the present disclosure will be disclosed directly or implicitly in the detailed description. That is, various effects predicted according to the exemplary embodiments of the present disclosure will be disclosed in the detailed description which is to be given below.

BRIEF DESCRIPTION OF THE DRAWINGS

FIG. 1b is a schematic cross-sectional view taken along line H-H of (FIG. 1a.

DETAILED DESCRIPTION

The terms used herein are for the purpose of describing specific exemplary embodiments, and are not intended to limit the present disclosure. As used herein, singular expressions include plural expressions unless they have definitely opposite meanings. The terms "include" and/or "including" specify the presence of the mentioned characteristics, integers, steps, operations, constituent elements, and/or components when used in the present specification, but it will also be understood that this does not exclude the presence or addition of one or more of other characteristics, integers, steps, operations, constituent elements, components, and/or groups thereof. As used herein, the term "and/or" includes any one or all combinations of the associated and listed items.

Figure 2:
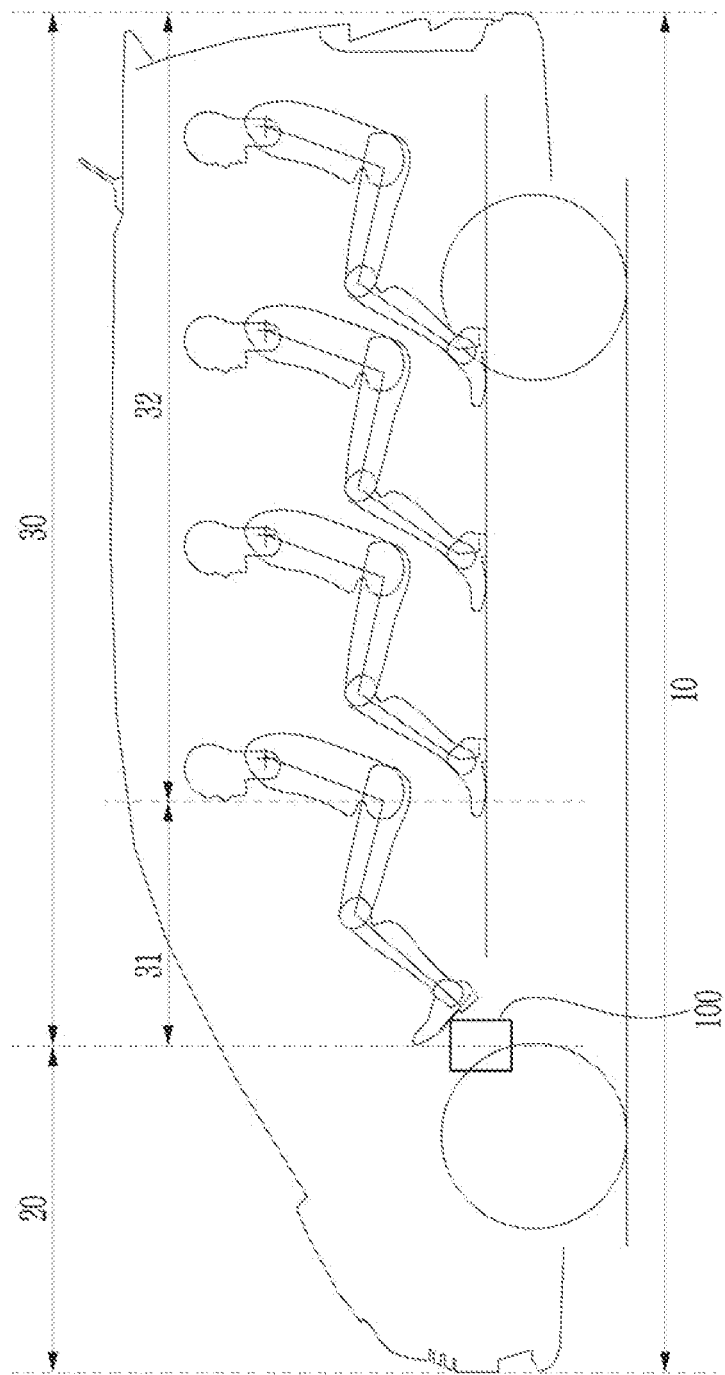
FIG. 2 is a diagram illustrating an engine room and an interior space of a vehicle to which an injury preventing structure according to an exemplary embodiment of the present disclosure is applied.
Figure 3:
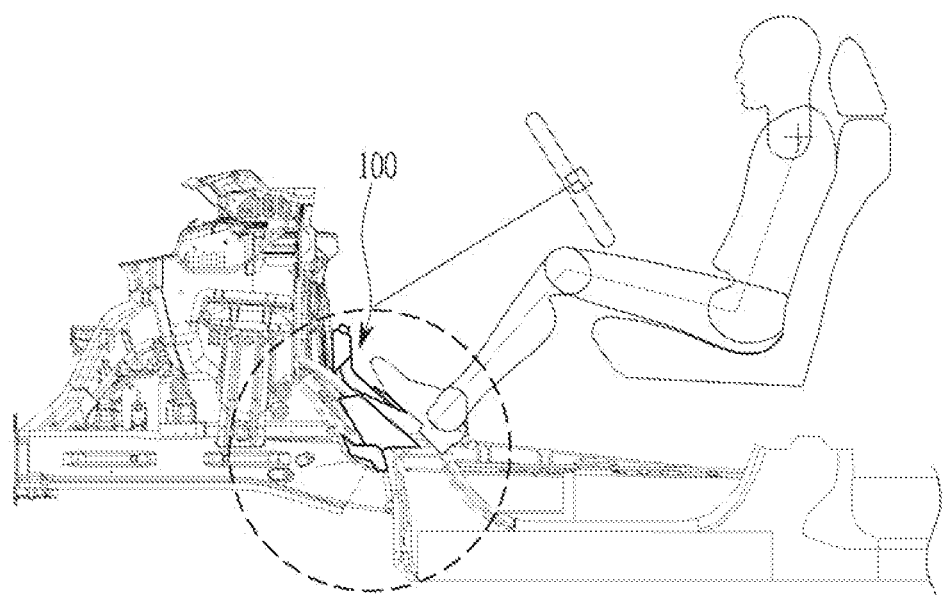
FIG. 3 is a diagram illustrating a position of the injury preventing structure of FIG. 2 within a vehicle.
Figure 4:
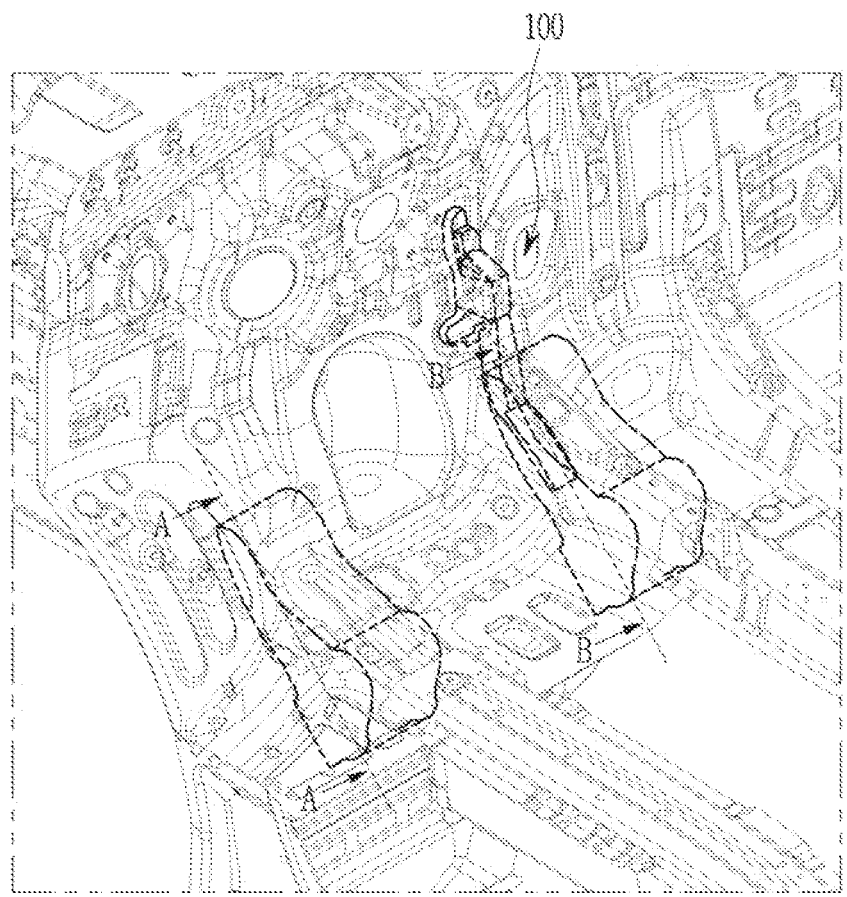
FIG. 4 is an enlarged diagram of the injury preventing structure of FIG. 3.
Figure 5A:
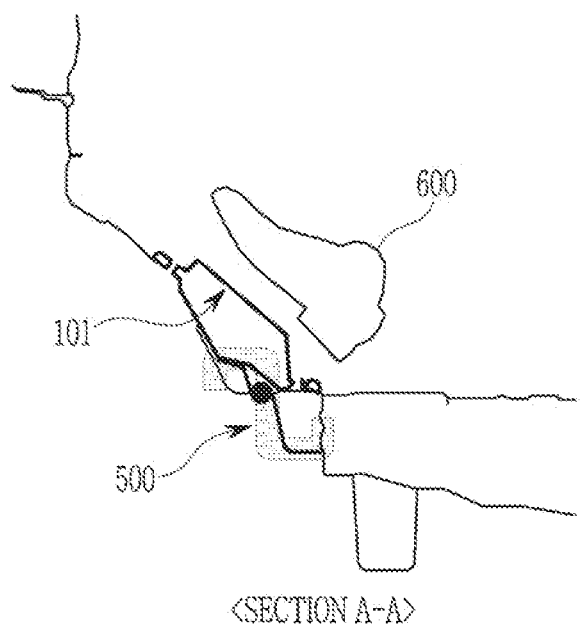
FIG. 5a is a schematic cross-sectional view taken along line A-A of FIG. 4.
Figure 5B:
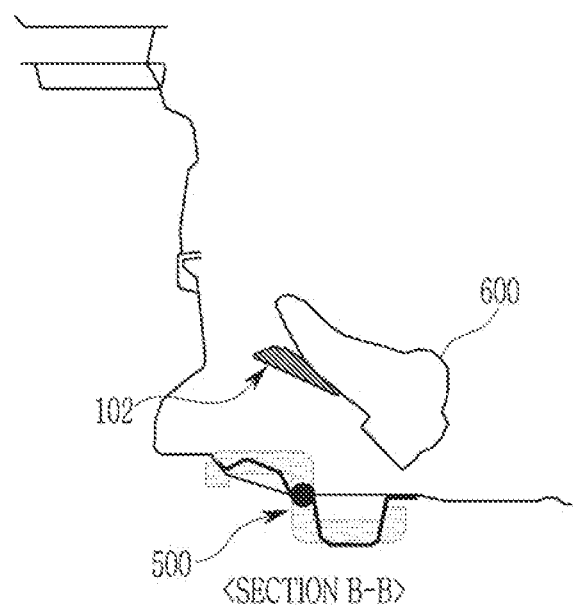
FIG. 5b is a schematic cross-sectional view taken along line B-B of FIG. 4.

FIG. 2 is a diagram illustrating an engine room and an interior space of a vehicle to which an injury preventing structure according to an exemplary embodiment of the present disclosure is applied, FIG. 3 is a diagram illustrating a position of the injury preventing structure of FIG. 2 within a vehicle, FIG. 4 is an enlarged diagram of the injury preventing structure of FIG. 3, FIG. 5a is a schematic cross-sectional view taken along line A-A of FIG. 4, and FIG. 5b is a schematic cross-sectional view taken along line B-B of FIG. 4. Referring to FIG. 2, an overall length 10 of a vehicle means a length between the frontmost part and the rearmost part of the vehicle. An overall width of the vehicle means the largest width among the widths perpendicular to the direction toward the door of the vehicle when the door of the vehicle is closed, and at the same time, the central axis in the direction of the overall length 10 of the vehicle. However, the length of a rearview mirror is not included.

The overall height of the vehicle means the height of the vehicle from the ground plane to the highest point when no occupants are on the vehicle or no cargo is loaded. The overall length, the overall width, and the overall height are criteria for determining the overall space of the vehicle. Hereinafter, in the present disclosure, it is assumed that the total width and the overall height of the vehicle do not change.

Accordingly, hereinafter, a scope, a cross-section, or an area means a value obtained by multiplying the length in the direction of the overall length 10 of the vehicle and the length of the direction of the overall height, and a space and a size means a value obtained by multiplying the length in the direction of the overall length 10 of the vehicle and the length of the direction of the overall with and the length of the direction of the overall height. Based on the values, the technology for reducing a first row space 31 and preventing injury of a driver will be described.

The direction of the overall length 10 of the vehicle means a direction from an engine room 20 to a rear seat space 32. The overall width of the vehicle means both left and right widths that are perpendicular to a central axis of the direction of the overall length 10.

The overall length 10 of the vehicle may be generally divided into a length of the engine room 20 and a length of an interior space 30. The engine room 20 is generally located on the front side of the vehicle and is a place in which important components, such as an engine, a battery, and an oil tank, for vehicle operation, are located, so that the engine room 20 is also called an engine room. The interior space 30 in which occupants can board is located at the rear side of the engine room 20.

The interior space 30 may be divided into the first row space 31 in which a driver's seat and a passenger's seat are located, and a rear seat space 32 located at the rear side of the first row space 31. The rear seat space 32 includes seats on which other occupants, except for the driver and the front occupant, can ride, and may include a space for loading cargo as needed. According to the exemplary embodiment of the present disclosure, a size of the rear seat space 32 may be increased.

Standards of the overall length 10 of the vehicle and the size of the vehicle according to the overall length 10 of the vehicle are set according to the type and the grade of the vehicle, so that a designer cannot arbitrarily adjust the overall length 10 of the vehicle and the size of the vehicle according to the overall length 10 of the vehicle. Accordingly, in order to increase the size of the rear seat space 32, it is necessary to reduce the size of the engine room 20 or the first row space 31 within the limited size of the vehicle.

However, the engine room 20 is the space where the engine and various accessories are arranged, and it is not feasible to reduce the space unless the sizes of the engine and the accessories are reduced, so that it is actually difficult to adjust the size of the engine room 20. Accordingly, the space except for the engine room 20 may be reduced. As one example, the first row space 31 may be reduced. When the first row space 31 is reduced, a size of an upper member 400 located in the lower portion of the first row space 31 may also be reduced. As a matter of course, the location at which the upper member 400 is formed is not limited to the lower portion of the first row space 31. According to the exemplary embodiment of the present disclosure, a technical characteristic of reducing the size of the upper member 400 and preventing impact applied to legs of the driver when a vehicle collides is disclosed.

The present disclosure discloses an injury preventing structure which is capable of preventing injury of a driver when a vehicle collides. As one example, an injury preventing structure 100 which is capable of preventing injury of leas of a driver when the vehicle collides is provided at a lower end of the first row space 31. The injury preventing structure 100 includes the lower member 200 and the upper member 400 which distribute an impact of the vehicle when the vehicle collides, with the panel 300 forming a bottom surface of the vehicle. As one example, the panel 300 may divide the engine room 20 and the interior space 30, and divide an interior side and an exterior side of the vehicle.

The plurality of members are used to not only distribute the impact force during a vehicle collision, but also prevent distortion and bending of the vehicle body, and serve to increase strength and rigidity of the vehicle body.

The upper member 400 may be provided in the upper portion of the lower member 200, and the panel 300 is provided between the lower member 200 and the upper member 400 to form a boundary. As one example, the lower member 200 may be provided at the exterior side of the vehicle, and the upper member 400 may be provided at the interior side of the vehicle.

The lower member 200 or the upper member 400 is in contact with the panel 300 to form a closed cross-section, thereby forming the injury preventing structure 100. As one example, the closed cross-section formed by the upper member 400 and the panel 300 which are relatively close to the legs of the driver based on the direction of the overall length 10 of the vehicle is formed in front of a collision deformation support shaft 500, and the closed cross-section formed by the lower member 200 and the panel 300 is formed behind the collision deformation support shaft 500, thereby protecting the driver from the impact generated due to the vehicle collision.

The close cross-section has more rigidity in torsion of the vehicle body due to the vehicle collision than an opened form. A location at which the rear end of the upper member 400 is in contact with the panel 300 based on the direction of the overall length 10 of the vehicle and the location at which the front end of the lower member 200 is in contact with the panel 300 at least partially overlap each other to form the collision transformation support shaft 500. As one example, in the place at which the distal ends of the dosed cross-sections face each other, that is, the place at which the rear end of the upper member 400 completely overlap the front end of the lower member 200, the collision transformation support shaft 500 may be formed in the direction of the total width of the vehicle.

Through the injury preventing structure 100, it is possible to minimize the size of the upper member 400 based on the direction of the overall length 10 of the vehicle. At the same time, it is possible to protect both feet of the driver from the transmitted impact when the vehicle collides. Hereinafter, the injury preventing structure 100 will be described in detail.

FIG. 4 illustrates a lower end of the first row space 31 in which the left foot and the right foot of the driver are located during travelling of the vehicle, FIG. 5a schematically illustrates the cross-section of the place in which the left foot of the driver is located, and FIG. 5b schematically illustrates the cross-section of the place in which the right foot of the driver is located.

As illustrated in FIG. 5a, a foot rest 101 is provided at the front side in the overall length direction of the lower end of the first row space 31 corresponding to the location of the left foot so that the foot can rest while the vehicle travels. The foot rest 101 is inclined upward toward the front side of the vehicle with respect to the ground, and the driver's foot 600 is placed on the foot rest 101. At the lower end of the first row space 31 located in front of the heel of the driver's foot 600, the upper member 400 and the lower member 200 are combined to form the collision transformation support shaft 500.

As illustrated in FIG. 5b, at the front side in the overall length direction of the lower end portion of the first row space 31 corresponding to the location of the right foot, an accelerator pedal 102 and a brake pedal (not illustrated) driven by the driver's foot 600 while the vehicle travels are provided. The accelerator pedal 102 is inclined upward toward the front side of the vehicle with respect to the ground similar to the foot rest 101, and the driver's foot 600 is placed on the accelerator pedal 102.

Based on the direction of the overall length 10 of the vehicle, at the point at which the driver's foot 600 is in contact with the panel 300 becomes the center of gravity of the legs of the driver. Accordingly, at the lower portion of the first row space 31 located in front of the point, the collision transformation support shaft 500 needs to be formed while the upper member 400 and the lower member 200 face each other with the panel 300 as the boundary. When the vehicle collides, the front portion based on the collision transformation support shaft 500 receives a larger impact, so as to prevent a large impact from reaching the driver.

Hereinafter, the cross-sections of the upper member 400 and the lower member 200 will be described in detail below.

Figure 6:
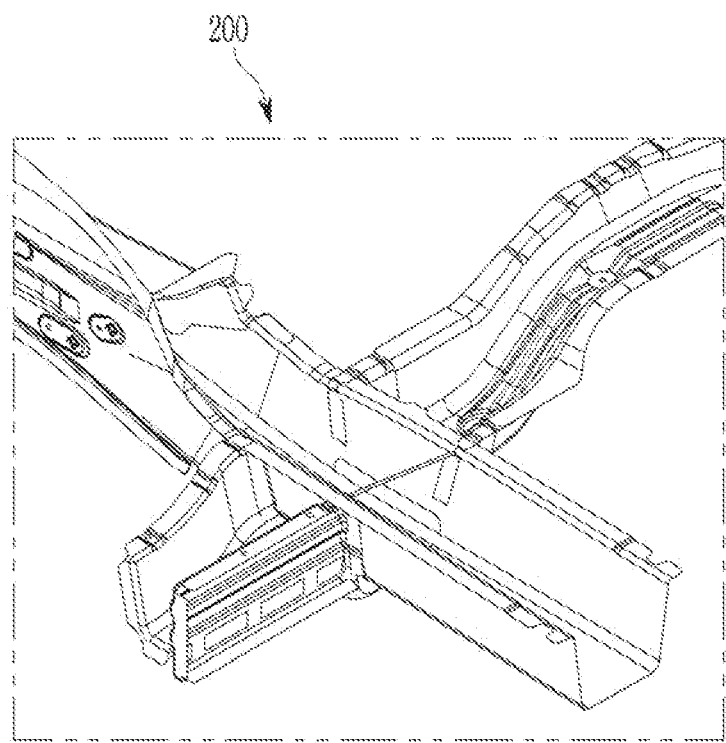
FIG. 6 is a perspective view illustrating a lower member configuring the injury preventing structure according to the exemplary embodiment of the present disclosure.
Figure 7:
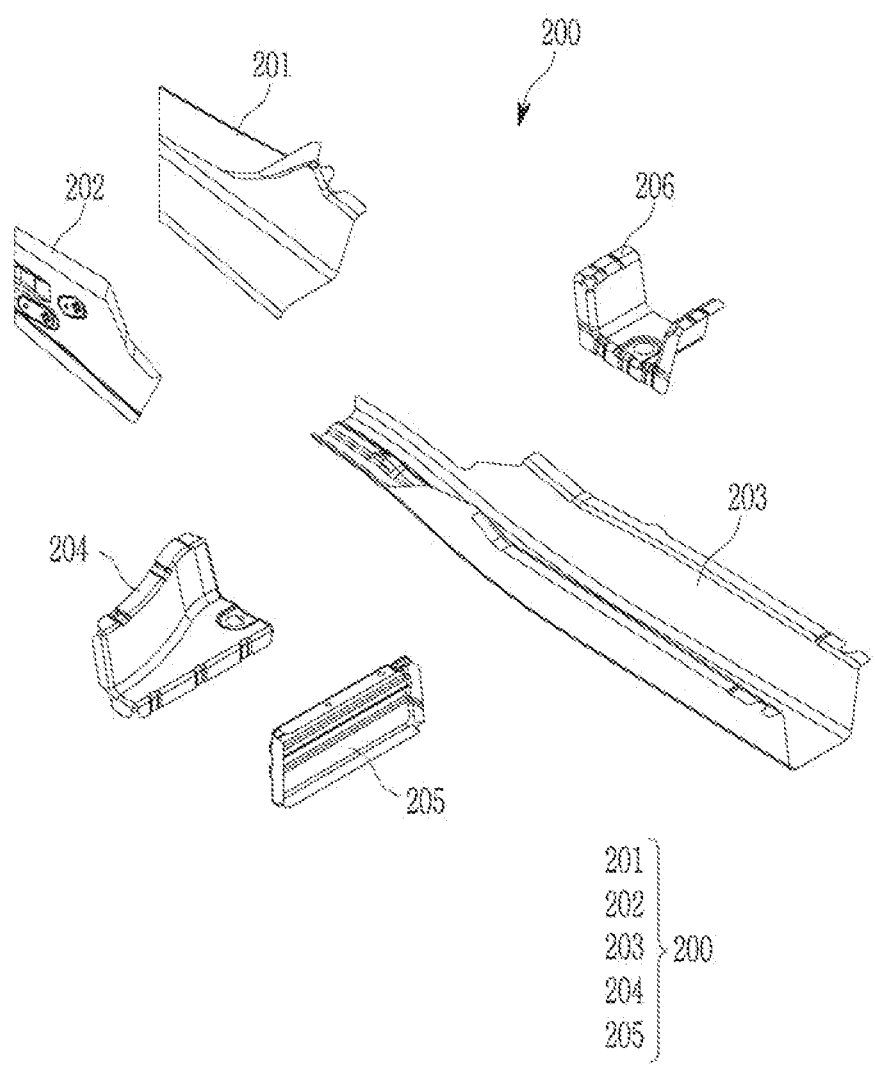
FIG. 7 is an exploded view of the lower member of FIG. 6.
Figure 8:
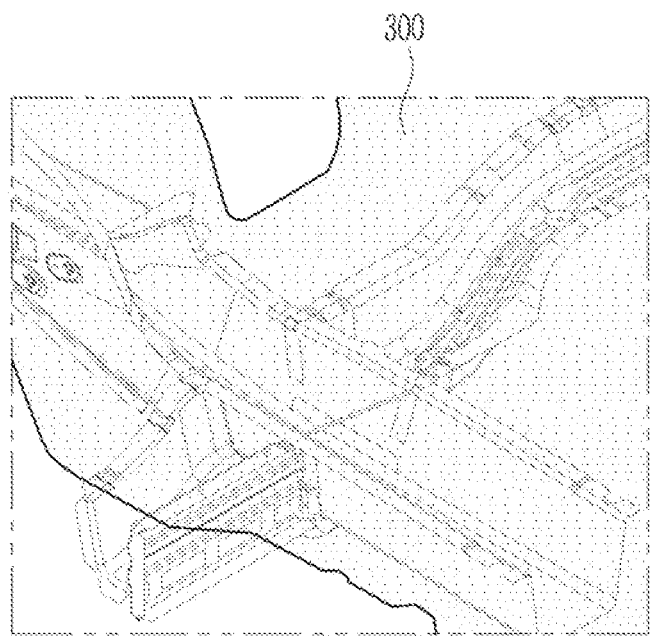
FIG. 8 is a perspective view illustrating the case where a panel and the lower member which configure the injury preventing structure according to the exemplary embodiment of the present disclosure are coupled.
Figure 9:
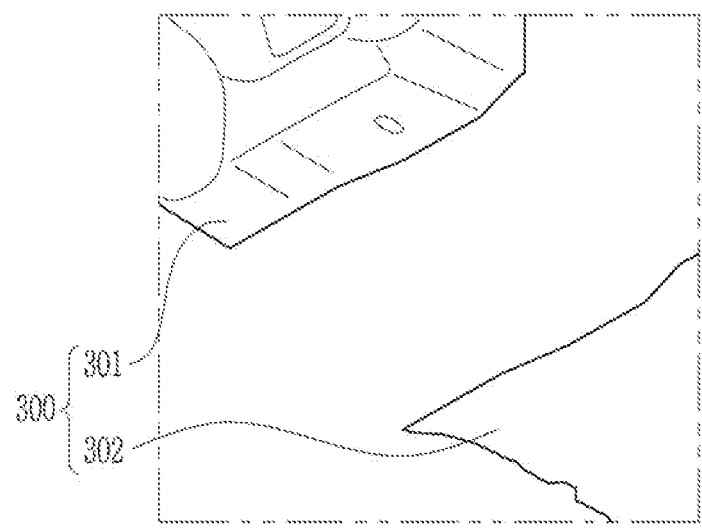
FIG. 9 is an exploded view of the panel of FIG. 8.
Figure 10:
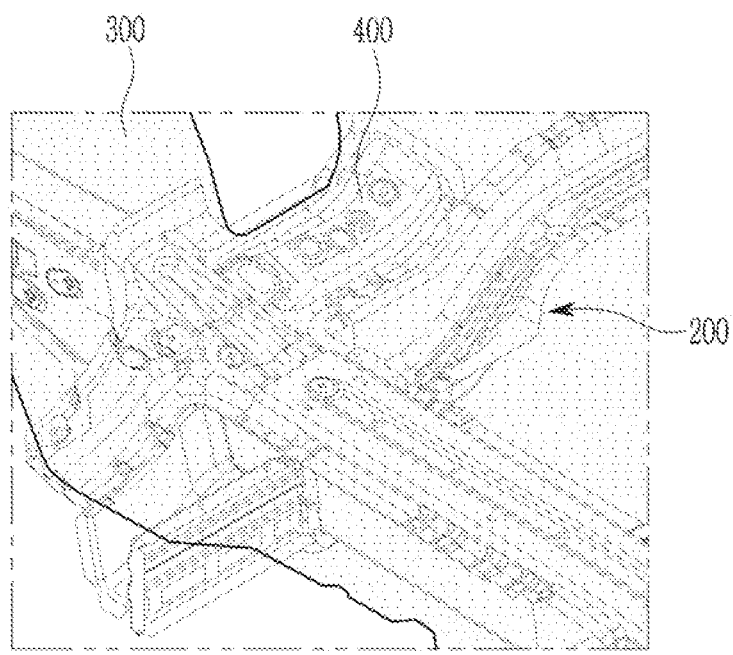
FIG. 10 is a perspective view illustrating the case where the panel, the lower member, and an upper member which configure the injury preventing structure according to the exemplary embodiment of the present disclosure are coupled.
Figure 11:
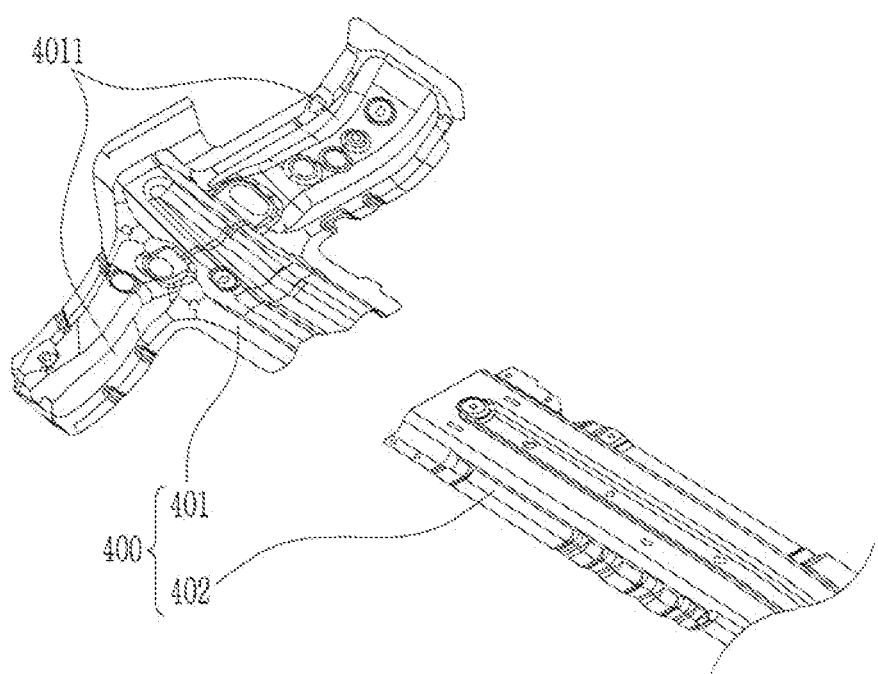
FIG. 11 is an exploded view of an upper member of FIG. 10.

FIG. 6 is a perspective view illustrating the lower member configuring the injury preventing structure according to the exemplary embodiment of the present disclosure, FIG. 7 is an exploded view of the lower member of FIG. 6, FIG. 8 is a perspective view illustrating the scenario in which the panel and the lower member which configure the injury preventing structure according to an exemplary embodiment of the present disclosure are coupled, FIG. 9 is an exploded view of the panel of FIG. 8, FIG. 10 is a perspective view illustrating the case where the panel, the lower member, and the upper member which configure the injury preventing structure according to an exemplary embodiment of the present disclosure are coupled, and FIG. 11 is an exploded view of the upper member of FIG. 10.

Referring to FIGS. 6 to 11, the configurations of the lower member 200, the panel 300, and the upper member 400 configuring the injury preventing structure 100 of the vehicle are described in detail.

As one example, the panel 300 includes a dash panel 301 and a center floor panel 302. The dash panel 301 sections the engine room 20 and the interior space 30 to block the interior side of the vehicle from the engine room 20. Further, the dash panel 301 directly forms the boundary between the upper member 400 and the lower member 200, and is the location in direct contact with the collision transformation support shaft 50 formed by the upper member 400 and the lower member 200. The center floor panel 302 is coupled to the dash panel 301 to extend to the rear side in the direction of the overall length 10 of the vehicle. As one example, the center floor panel 302 may at least define the lower end of the first row space 31 to divide the interior side and the exterior side of the vehicle.

The lower member 200 is located in a lower portion of the panel 300. As one example, the lower member 200 is formed by cross-linking two different shafts in the lower portion of the first row space 31. The two shafts are defined as a first shaft and a second shaft. Based on a crossing point at which the first shaft and the second shaft are coupled while crossing, the first shaft is formed to be longer in the direction of the overall length 10 of the vehicle compared to the second shaft, and the second shaft is formed longer in the direction of the overall width of the vehicle compared to the first shaft.

As another example, the lower member 200 has a structure in the form of a cross, a plus sign, or two intersecting lines perpendicular to each other. Each of the two shafts has a concave recess in the middle and has an open top portion. This is for the purpose of the lower member 200 being in contact with the panel 300 to form the closed cross-section.

The first shaft between the two shafts may extend in the direction of the overall length 10 of the vehicle. According to the design, the first shaft may be integrally formed. As one example, the first shaft may be formed by coupling an inner member 201, a side outer member 202, and a rear lower member 203. The second shaft may be generally disposed in the direction of the overall width of the vehicle. The second shaft may extend in the direction of the overall width of the vehicle. Accordingly, the lower member 200 may form the closed cross-section with the panel 300 in the direction of the overall width of the vehicle, which increases torsional rigidity of the vehicle and protects a driver from an impact occurring due to the front collision of the vehicle.

As one example, the second shaft may be formed of a dash tunnel member 206 located inside the vehicle, a side outer front member 204 and a side outer rear member 205 located outside the vehicle. Similarly, according to the design, the side outer front member 204 and the side outer rear member 205 may be formed as one member.

To describe this example in further detail, the dash tunnel member 206 is coupled to one surface of one shaft, and the side outer front member 204 and the side outer rear member 205 are coupled to each other and are coupled to the opposite surface of the one shaft. Accordingly, the side inner member 201, the side outer member 202, and the rear lower member 203 of one shaft are connected with one another, but the dash tunnel member 206, the side outer front member 204, and the side outer rear member 205 configuring the other shaft are spaced apart from each other on one surface and the opposite surface of the one shaft.

The upper member 400 is located on the panel 300. As one example, the upper member 400 may have a shape that is padded on the panel 300 in the interior side of the vehicle at the lower end of the first row space 31. The upper member 400 may be flange-coupled with the lower member 200 with the panel 300 as the boundary. The coupling method may comprise screw engagement, welding, or other known coupling methods. The lower portion of the upper member 400 is opened so as to be in contact with the panel 300 to form the closed cross-section.

The upper member 400 includes a dash member 401 that is in contact with the lower member 200 with the panel 300 as the boundary and a center floor member 402 connected with the dash member 401. In one example, the dash member 401 has a structure shaped like a cross, a plus sign, or two intersecting lines perpendicular to each other, that is similar to the form of the lower member 200. In the structure, the dash member 401 may include a side dash member 4011 extending in the direction of the overall width of the vehicle from a body part of the dash member 401 formed in the direction of the overall length 10 of the vehicle.

The side dash member 4011 may be in contact with the panel 300 to form the dosed cross-section extending in the direction of the total width of the vehicle. Further, the side dash member 4011 may be in contact with the second shaft extending in the direction of the overall width of the vehicle of the lower member 200 with the panel 300 as the boundary and extend to the front passenger seat of the first row space 31.

Referring to FIG. 10, the configuration of the second shaft of the lower member 200 corresponding to the same configuration as the configuration extending in the direction of the door of the driver's seat among the configurations of the side dash member 4001 extending in the direction of the overall width of the vehicle may form the closed cross-section based on the panel 300 as the boundary. An example of the configuration of the lower member 200 may include the configuration in which the side outer front member 204 is coupled with the side outer rear member 204.

The center floor member 402 faces the first shaft extending in the direction of the overall length 10 of the vehicle of the lower member 200 in the straight form and extends to the rear side in the direction of the overall length 10 of the vehicle. The collision transformation support shaft 500 may be formed at the location at which the front end in the direction of the overall length of the second shaft of the lower member 200 faces the rear end in the direction of the overall length of the dash member 401 that is the partial configuration of the upper member 400 with the panel 300 as the boundary.

Figure 12:
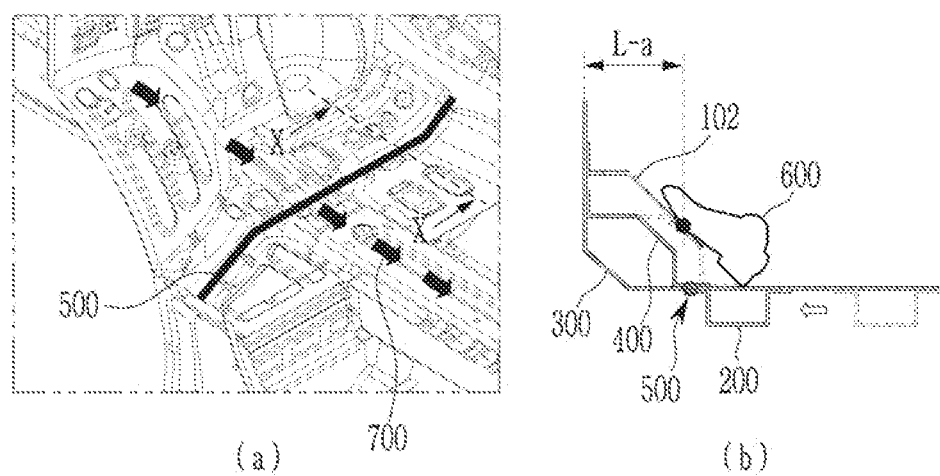
FIG. 12 is a diagram schematically illustrating locations and cross-sections of the upper member and the lower member according to the exemplary embodiment of the present disclosure.
Figure 13A:
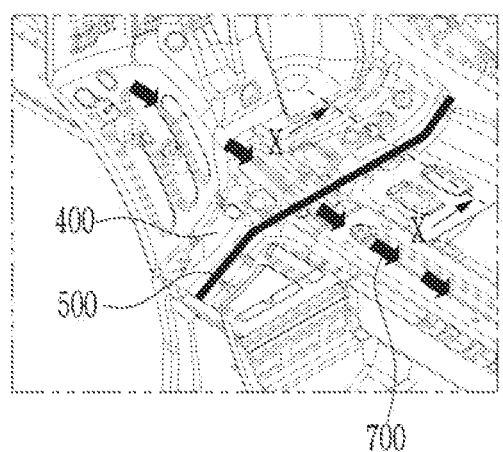
FIGS. 13a and 13b are diagrams illustrating the case where a collision transformation support shaft according to the coupling of the upper member and the lower member is formed according to the exemplary embodiment of the present disclosure.
Figure 13B:
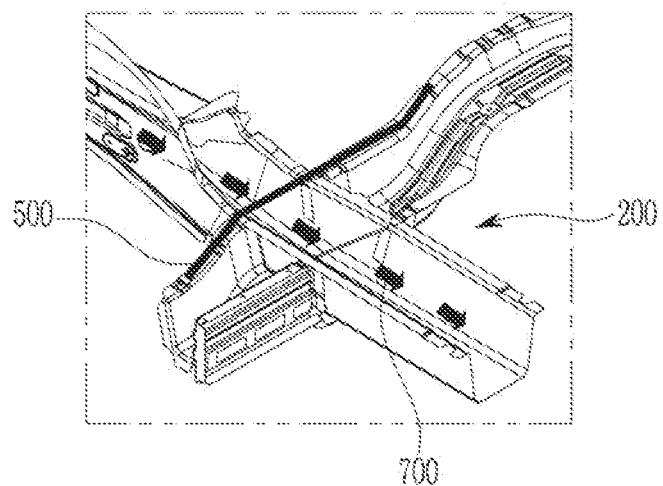

FIG. 12 is a diagram schematically illustrating locations and cross-sections of the upper member and the lower member according to the exemplary embodiment of the present disclosure, and FIGS. 13a-b are diagrams illustrating the case where the collision transformation support shaft according to the coupling of the upper member and the lower member is formed according to the exemplary embodiment of the present disclosure.

Figure 1A:
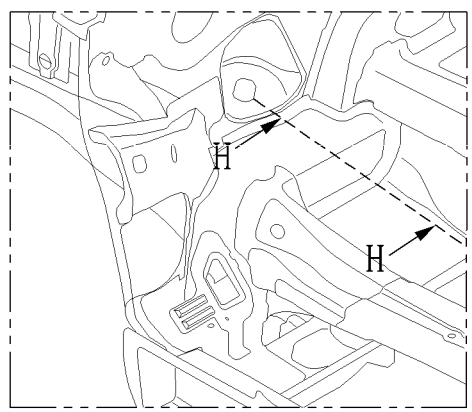
FIG. 1a is a diagram schematically illustrating a lower portion of the first row space of a vehicle in the related art.
Figure 1B:
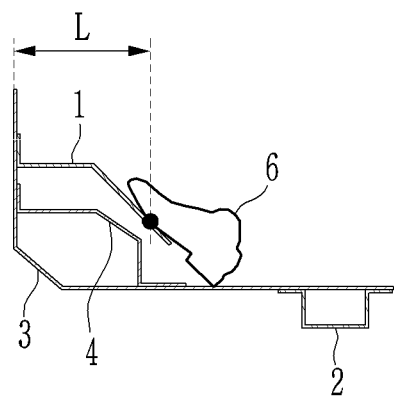

Referring to FIGS. 12 and 13, it can be seen that the lower member 200 is located in front of the related art (see the lower member 2 of FIG. 1B) based on the length direction of the overall length 10 of the vehicle. One exemplary embodiment will be described based on the location of the right foot of the driver during driving. The front end of the lower member 200 is located just under the rear end of the upper member 400 based on the boundary surface formed by the panel 300.

Accordingly, for example, the rear end in the direction of the overall length of the upper member 400 is coupled to the front end in the direction of the overall length of the lower member 200, so that the collision transformation support shaft 500 is formed in the length direction of the overall width of the vehicle. In further detail, the collision transformation support shaft 500 is formed at the rear end in the direction of the overall length of the dash member 401 of the upper member 400, and is formed at the front end in the direction of the overall length of the second axis extending in the overall width of the vehicle of the lower ember 200.

As one example, when the cross-sections of the upper member and the lower member are checked, the collision transformation support shaft 500 has a shape dose to a backwards "S" shape, "ㄹ", in the direction parallel to the length direction of the overall height of the vehicle. Accordingly, the collision transformation support shaft 500 formed by the shape is formed at the point at which the panel 300 is in contact with the driver's foot 600 based on the direction of the overall length 10 of the vehicle, specifically, at the front side of the heel corresponding to the center of gravity of the driver's foot 600. As a matter of course, the position of the driver's foot 600 is flexible during the travelling of the vehicle, but as one example, the collision transformation support shaft 500 may be designed to be formed in front of the heel of the driver's foot 600 even in the state where the driver's foot 600 is placed as far in front of the driver's foot 600 as possible based on the direction of the overall length 10 of the vehicle from the driver's position, for example, the driver places the foot on the accelerator pedal 102 or the brake pedal (not illustrated). Accordingly, since the position of the center of gravity of the leg is placed behind the position of the collision transformation support shaft 500 based on the direction of the overall length 10 of the vehicle, it is possible to minimize transmission of the impact force to the driver when the collision occurs, thereby preventing injury of the legs.

Particularly, in the scenario of the present disclosure, the collision transformation support shaft 500 may be formed while a collision road path 700 is maintained by the upper member 400 and the lower member 200. The engine pushing in at the time of a frontal collision or collision of the vehicle also applies a simultaneous impact to the panel 300, particularly, the dash panel 301, and the impact applied to the dash panel 301 is also transmitted to the interior space 30, and the present disclosure distributes the impact force transmitted to the rear side in the direction of the overall length of the vehicle based on the collision transformation support shaft 500 through the collision road path, thereby minimizing injury of the occupant.

Overall, according to the exemplary embodiment of the present disclosure, there is formed the occupant injury preventing structure in which the dosed cross-section is formed between the lower member 200 and the panel 300 positioned at the lower end of the first row space 31, the closed cross-section is formed between the upper member 400 and the panel 300, one end of the lower member 200 and one end of the upper member 400 face with the panel 300 as the boundary through the position movement of the lower member 200, the collision transformation support shaft 500 is formed, and the shape of each closed cross-section has the shape close to the backward "S" or "ㄹ", based on the collision transformation support shaft 500 when the vehicle is viewed in the direction of the overall width of the vehicle.

Particularly, the sectional injury preventing structure having the shape close to the shape of a backward "S" or "ㄹ" may reduce the cross-section of the upper member 400 and form the collision transformation support shaft 500 in front of the center of gravity of the driver's foot 600, so that it is possible to minimize the transmission of the impact force to the rear side of the collision transformation support shaft 500 when the frontal collision of the vehicle occurs, thereby preventing the injury of the legs of the occupants.

Hereinafter, through one exemplary embodiment, in comparison with the related art, the cross-sectional area reduction ratio of the upper member 400 and the possibility of securing the rear seat space 32 according to the cross-sectional area reduction ratio of the upper member 400 will be described in detail.

In order to check the cross-sectional area reduction ratio of the upper member 400, the length of the upper member 400 in the direction of the overall height of the vehicle is first set with a fixed value. The typical length of the upper member 400 in the direction of the overall length 10 of the vehicle is defined as "L". As one example, the typical length L of the upper member 400 in the direction of the overall length 10 of the vehicle corresponds to about 270 millimeters (mm).

Further, the reduced length of the upper member 400 in the direction of the overall length 10 of the vehicle according to the exemplary embodiment of the present disclosure is defined as "a". A size of "a" is not particularly limited. As one example, "a" may correspond to a length in the range of 0 mm to 80 mm, to a length of 0 mm or more, or to 80 mm or less.

Accordingly, according to the exemplary embodiment of the present disclosure, the length of the upper member 400 in the direction of the overall length 10 of the vehicle may be reduced by "a" compared to the typical length L. "L−a" corresponds to the length of the upper member 400 in the direction of the overall length 10 of the vehicle formed according to the exemplary embodiment of the present disclosure. Accordingly, it is possible to secure the rear seat space by further moving the seat forward by "a". As one example, the seat of the first row space 31 may be further moved forward by "a".

As one example, when the reduced length a is 80 mm, and the typical length L of the upper member 400 is about 270 mm, the length in the direction of the overall length 10 of the vehicle of the upper member 400 may correspond to about 190 mm. Further, the seat of the first row space 31 may be further moved forward by 80 mm.

In particular, as compared to the related art, there is an effect of reducing the cross-section of the upper member 400, securing the rear seat space 32, and preventing injury of the legs of the occupant riding in the first row space 31. Particularly, as one example, the present disclosure improves a commercial value of the MPV that places importance on the size of the rear seat space 32.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An injury preventing structure, comprising:
   a lower member and an upper member which distribute impact of a vehicle; and
   a panel which forms a bottom surface of the vehicle and divides an interior side and an exterior side of the vehicle,
   wherein the upper member and the lower member are in contact with the panel to form a closed cross-section between each member and the panel, and
   wherein a position in which the panel is in contact with a rear end of the upper member and a position in which the panel is in contact with a front end of the lower member at least partially overlap each other to form a collision transformation support shaft.

2. The injury preventing structure of claim 1, wherein:
   the closed cross-section formed by the upper member and the panel is formed in front of the collision transformation support shaft based on a direction of an overall length of the vehicle, and
   the closed cross-section formed by the lower member and the panel is formed behind the collision transformation support shaft.

3. The injury preventing structure of claim 1, wherein:
   the lower member is provided in a lower portion of the panel, and the upper member is provided in an upper portion of the panel.

4. The injury preventing structure of claim 1, wherein:
   the lower member is formed by cross-linking a first shaft extending in a direction of an overall length of the vehicle and a second shaft extending in a direction of an overall width of the vehicle.

5. The injury preventing structure of claim 4, wherein:
   the first shaft is formed by coupling an inner member, a side outer member, and a rear lower member,
   the second shaft is formed of a dash tunnel member located inside the vehicle, a side outer front member, and a side outer rear member located outside the vehicle.

6. The injury preventing structure of claim 4, wherein:
   the upper member includes a dash member, and a center floor member extending to the rear side in the direction of the overall length of the vehicle, and
   the dash member includes a side dash member extending in a direction of the overall width of the vehicle.

7. The injury preventing structure of claim 6, wherein:
   the collision transformation support shaft is formed at a location at which a front end in the direction of an overall length of the second shaft of the lower member faces a rear end in the direction of an overall length of the dash member.

8. The injury preventing structure of claim 6, wherein:
   the second shaft of the lower member is in contact with the panel to form a closed cross-section extending in the direction of the overall width of the vehicle.

9. The injury preventing structure of claim 6, wherein:
   the side dash member is in contact with the panel to form a closed cross-section extending in the direction of the overall width of the vehicle.

10. The injury preventing structure of claim 1, wherein:
    the panel is formed of a dash panel that is in contact with the collision transformation support shaft, and a center floor panel which is connected with the dash panel and extends in the rear side in the direction of the overall length of the vehicle.

* * * * *